United States Patent [19]

Carlson

[11] Patent Number: 4,642,454

[45] Date of Patent: Feb. 10, 1987

[54] INFRARED INTRUSION DETECTOR WITH FIELD OF VIEW LOCATOR

[75] Inventor: Paul S. Carlson, Santa Cruz, Calif.

[73] Assignee: Raytek, Inc., Santa Cruz, Calif.

[21] Appl. No.: 644,768

[22] Filed: Aug. 27, 1984

[51] Int. Cl.$^4$ .............................................. G01V 9/04
[52] U.S. Cl. ................................... 250/221; 250/342
[58] Field of Search ................. 250/221, 222.1, 342, 250/353, 347; 340/565, 567, 541

[56] References Cited

U.S. PATENT DOCUMENTS

| | | | |
|---|---|---|---|
| 3,475,608 | 10/1969 | Pardes | 250/347 |
| 3,500,048 | 3/1970 | Menke | 250/342 |
| 3,594,578 | 7/1971 | Ohman | 250/347 |
| 4,087,689 | 5/1978 | Asawa | 250/342 |
| 4,258,255 | 3/1981 | Guscott | 250/342 |
| 4,268,752 | 5/1981 | Herwig et al. | 250/342 |
| 4,447,726 | 5/1984 | Mudge et al. | 250/342 |
| 4,498,002 | 2/1985 | Tekirdaglis | 250/221 |

Primary Examiner—David C. Nelms
Assistant Examiner—Michael Messinger
Attorney, Agent, or Firm—Townsend & Townsend

[57] ABSTRACT

Passive infrared intrusion detector with means for determining the location of the fields of view covered by the system. In one disclosed embodiment, a small mirror is positioned near the sensing element and oriented so that a person looking at this mirror sees the fields of view through the optical system of the detector. A reference mark on the mirror appears in each of the fields seen by the person.

7 Claims, 5 Drawing Figures

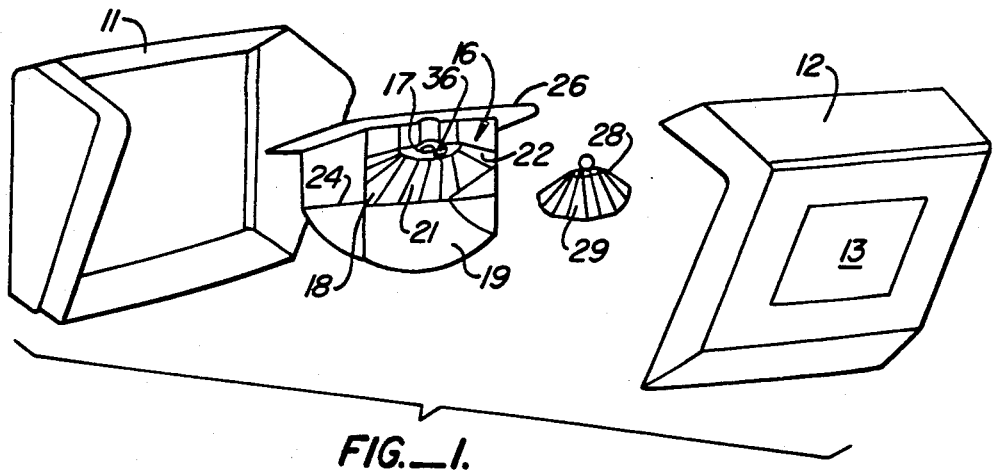
FIG._1.
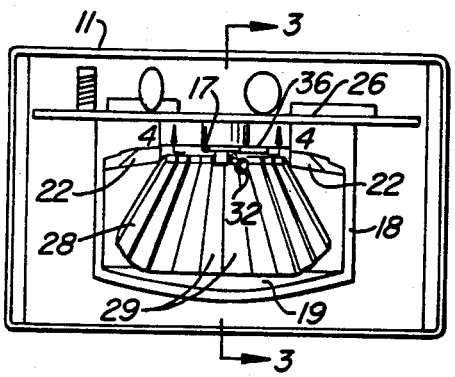
FIG._2.
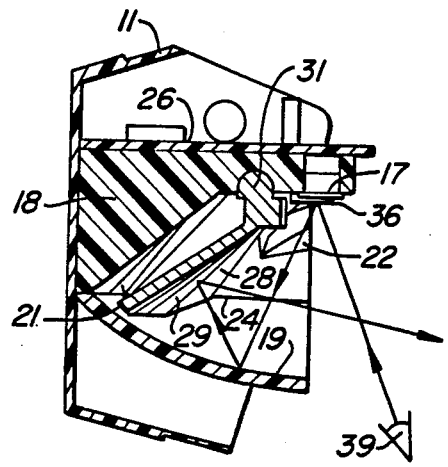
FIG._3.
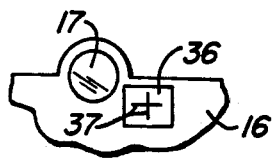
FIG._4.
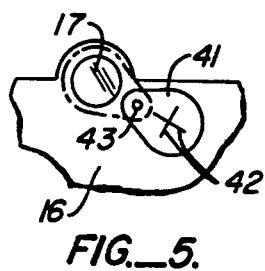
FIG._5.

INFRARED INTRUSION DETECTOR WITH FIELD OF VIEW LOCATOR

This invention pertains generally to security devices, and more particularly to a passive infrared intrusion detector.

In a passive infrared intrusion detector, the presence of an intruder is detected by infrared energy radiated by his body. U.S. Pat. No. 3,703,718 describes a system having optical means for focusing infrared energy from a plurality of fields of view onto a detector element, with the presence of an intruder being detected by the change in energy observed as he moves through the fields. U.S. Pat. No. 4,271,360 shows a similar system having a multifaceted mirror for gathering energy from the desired fields and a separate mirror for focusing this energy on the detector.

With these systems, it is important to position the fields of view where they will be entered by an intruder, and since the fields are not delineated in any visible manner, it is difficult for a person installing or adjusting the system to determine where the fields are located. The location of the fields is most commonly determined by "walk testing", i.e. walking through the area in which the system is installed and observing the zones in which movement is detected. This is a time consuming procedure and one in which it is difficult to determine the precise boundaries of the different fields.

In one system heretofore provided, a light source is positioned near the sensing element to help locate the fields of view. The light source is visible through the optical system of the detector from each of the fields of view, and a person standing in the fields can determine where they are located. While this is somewhat of an improvement over the conventional "walk test", the installer is still required to walk through the fields of view to see the light source, and when he does so, he is not in position to make any necessary adjustments to the system.

It is in general an object of the invention to provide a new and improved intrusion detector of the passive infrared type.

Another object of the invention is to provide an intrusion detector of the above character in which the fields of view are readily located.

These and other objects are achieved in accordance with the invention by positioning a field locating optical element near the sensing element of an infrared intrusion detector. The field locating element is oriented so that a person looking at this element sees the fields of view through the optical system of the detector. The field locator has a reference mark which to a person looking at the element appears to be at a central position in each of the fields of view.

FIG. 1 is an exploded perspective view of one embodiment of an intrusion detector according to the invention.

FIG. 2 is a front elevational view of the embodiment of FIG. 1 with the cover of the unit removed.

FIG. 3 is a cross-sectional view taken along line 3—3 in FIG. 2.

FIG. 4 is an exploded fragmentary view taken along line 4—4 in FIG. 2.

FIG. 5 is a view similar to FIG. 4 of another embodiment of an intrusion detector incorporating the invention.

As illustrated in FIGS. 1-4, the intrusion detector comprises a housing having a base portion 11 and a cover 12. The base portion is adapted to be mounted in a stationary position on a wall or other support (not shown), and the cover is removably mounted on the base portion. The cover has a window 13 which permits infrared energy to enter the housing from the protected space.

A stationary mirror assembly 16 and an infrared sensing element 17 are mounted in fixed positions in the base portion 11 of the housing. The mirror assembly includes a multi-faceted directing mirror 18 and a focusing mirror 19. The directing mirror reflects energy from a plurality of fields of view to the focusing mirror and the sensing element. The mirror illustrated has first and second groups of facets or reflective segments 21, 22. Segments 21 face in a generally outward direction and gather energy from more distant fields of view, and segments 22 face in a generally downward direction and gather energy from closer fields of view. Focusing mirror 19 comprises a spherical or parabolic reflector which focuses the radiation reflected by the directing mirror segments onto the sensing element.

In the embodiment illustrated, mirror assembly 16 is formed in two sections which are joined together along a horizontal line 24 to form a generally rectangular structure having a frontal opening aligned with window 13. Directing mirror 18 is located in the upper section of the structure, and focusing mirror 19 is positioned below the directing mirror in the lower section.

Sensing element 17 is mounted on a circuit board 26 which is mounted on the upper side of mirror assembly 16. This circuit board contains circuitry for processing the signal from the sensing element and producing an output signal or alarm in response to a change in the level of infrared energy impinging upon the detector, as happens when a warm bodied object moves into or out of one of the fields of view.

An adjustable mirror 28 is pivotally mounted in mirror assembly 16 in front of segments 21 of the directing mirror. Mirror 28 has a plurality of reflective segments or facets 29 which reflect energy from a plurality of fields of view toward focusing mirror 19 and sensing element 17. Mirror 28 is mounted on the upper section of mirror assembly 16 by a ball and socket assembly 31 which permits the position of this mirror to be adjusted about both horizontal and vertical axes relative to the focusing mirror and the sensing element. This adjustment enables the detector to cover different fields of view simply by re-positioning the adjustable mirror. The adjustable mirror is removably mounted in the mirror assembly, and it can be secured in a desired position by a thumbscrew 32.

A field locating mirror 36 is mounted on the upper section of mirror assembly 16 near sensing element 17. This mirror is of relatively small size, and it is positioned as close to the sensing element as possible so that it will be at or very close to the focal point of spherical mirror 19. A reference mark 37 is provided on mirror 36, and in the embodiment illustrated this mark comprises a pair of crossed lines or "crosshairs". In this embodiment, the field locating mirror is removably mounted directly in front of the sensing element and secured by a suitable clamp (not shown).

Field locating mirror 36 faces generally toward focusing mirror 19, and it is oriented so that a person looking into the locating mirror in the direction indicated by eye 39 in FIG. 3 actually sees the fields of view covered by the detector In so doing, the person is looking through the optical system of the detector, and light from the fields which he sees is reflected by directing mirror 28 and focusing mirror 19 in the same manner that infrared radiation is focused upon the sensing element. The person looking into mirror 36 also sees reference mark 37 which appears to be near the center of each of the fields of view.

Even though mirror 36 does not coincide exactly with sensing element 17 at the focal point of the optical system, it nevertheless provides a highly accurate indication as to where the fields of view are located. In a room of average size, for example, the fields of view or zones of surveillance are located with an accuracy on the order of a few inches throughout the room. The person looking into the locating mirror is in position to make any adjustments desired in the detector and to directly observe the effect of these adjustments on the fields of view.

The field locating mirror can be of any desired size and shape, but it is preferably thin and of small lateral extent so that it can be positioned as close to the sensing element as possible. It can be a flat mirror, a concave mirror or a convex mirror, depending on the image desired.

In the embodiment of FIG. 5, a field locating mirror 41 having reference marks 42 is pivotally mounted near sensing element 17. Mirror 41 is mounted on mirror assembly 16 by a pivot pin 43, and it can be positioned in front of the sensing element for use, as illustrated in phantom lines in FIG. 5. For normal operation of the detector, mirror 41 can be moved away from the sensing element to the position shown in full lines in FIG. 5. Alternatively, the locating mirror can be temporarily mounted in front of the sensing element by means permitting the mirror to be removed from the assembly during normal operation of the detector.

The field locating mirror (mirror 36 in the embodiment of FIGS. 1-4) can be fabricated of a material which is transparent to infrared energy but reflective to visible light, in which case the mirror can be left in front of the sensing element when the system is in use. Suitable materials for this mirror include silicon, germanium and other semiconductor materials. The sensing element itself can also be fabricated of a material which reflects visible light, in which case the sensing element can function as the field locating mirror.

The field locating mirror can also be utilized in conjunction with a secondary optical system which provides the same fields of view as the optical system associated with the sensing element. A person looking into this mirror would see the same fields of view as the sensing element, but through a different optical system.

It is apparent from the foregoing that a new and improved intrusion detector has been provided. While only certain presently preferred embodiments have been described in detail, as will be apparent to those familiar with the art, certain changes and modifications can be made without departing from the scope of the invention as defined by the following claims.

I claim:

1. In an infrared intrusion detector: a sensing element responsive to infrared energy, an optical system for focusing infrared energy from a plurality of fields of view onto the sensing element, means connected to the sensing element for providing an output signal in response to movement of an object in one of the fields of view, and an additional optical mirror positioned at about the focal point of said optical system and oriented such that a person looking at the additional optical mirror sees the fields of view detected by the sensing element through the optical system.

2. The intrusion detector of claim 1 wherein the additional optical mirror has a reference mark which to the person looking at the additional optical mirror appears to be at a central position in each of the fields of view.

3. The intrusion detector of claim 2 wherein the reference mark comprises a pair of crossed lines near the center of the additional optical mirror.

4. The intrusion detector of claim 1 wherein the additional optical mirror is removably mounted between the sensing element and the optical system.

5. The intrusion detector of claim 1 wherein the optical system includes at least one adjustable element for changing the fields of view.

6. In an infrared intrusion detector: a sensing element responsive to infrared energy on the sensing element, a directing mirror having a plurality of facets for directing infrared energy from a plurality of fields of view to the focusing mirror, means connected to the sensing element for providing an output signal in response to movement of an object in one of the fields of view, and a field locating mirror, having a reference mark, positioned at about the focal point of said focusing mirror and facing generally toward the focusing mirror so that a person looking at the locating mirror sees the fields of view detected by the sensing element as reflected by the directing mirror, the focusing mirror, and the field locating mirror, with the reference mark appearing in each of the fields of view.

7. The intrusion detector of claim 6 wherein the reference mark comprises a pair of crossed lines.

* * * * *